E. S. EVANS.
CHOCK BLOCK.
APPLICATION FILED JUNE 17, 1916.

1,222,374.

Patented Apr. 10, 1917
2 SHEETS—SHEET 1.

Inventor,
E. S. Evans

By T. R. Bryant
Attorney

E. S. EVANS.
CHOCK BLOCK.
APPLICATION FILED JUNE 17, 1916.
1,222,374.
Patented Apr. 10, 1917.
2 SHEETS—SHEET 2.
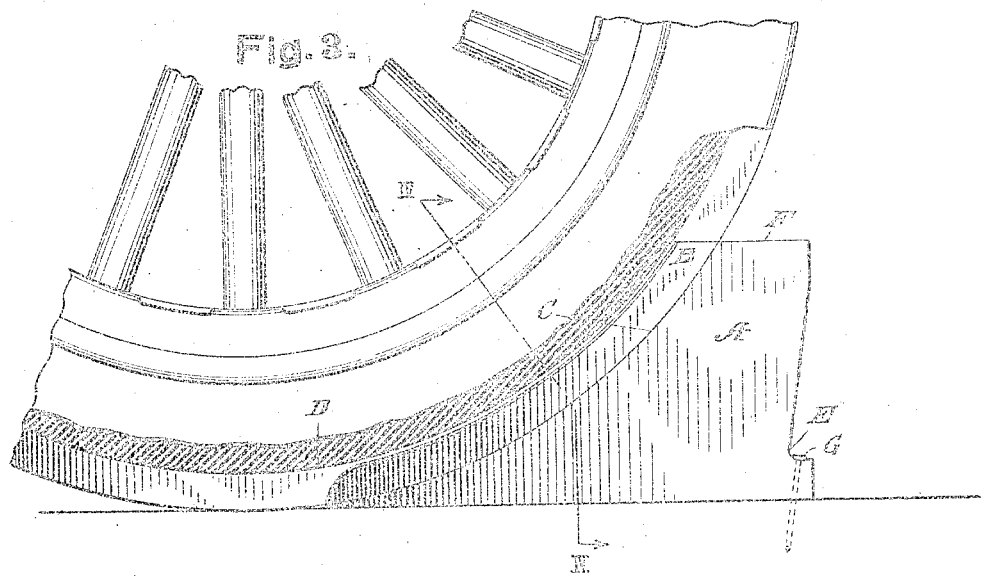
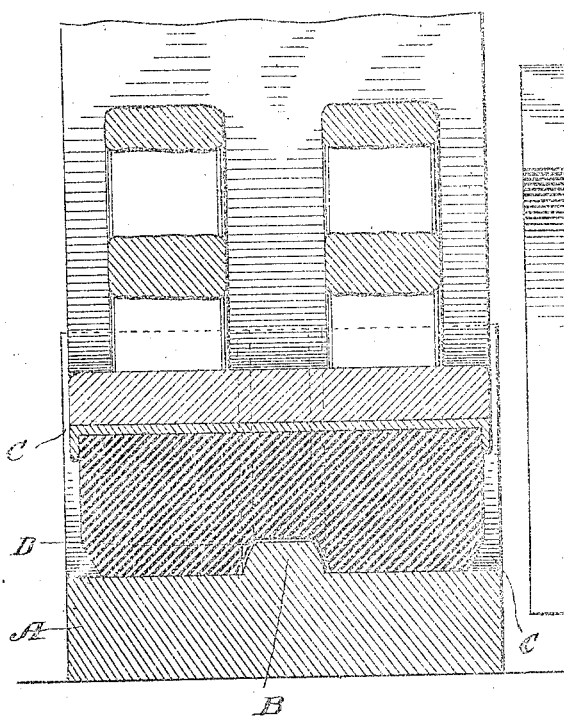
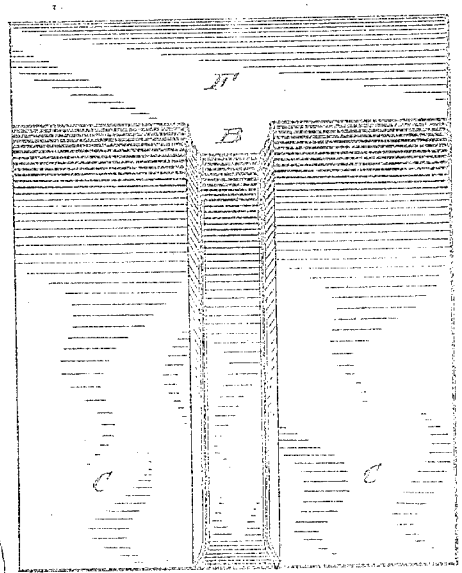
Inventor
E. S. Evans.
By
T. R. Bryant,
Attorney.

UNITED STATES PATENT OFFICE.

EDWARD S. EVANS, OF RICHMOND, VIRGINIA.

CHOCK-BLOCK.

1,222,374.  Specification of Letters Patent.  Patented Apr. 10, 1917.

Application filed June 17, 1916. Serial No. 104,179.

*To all whom it may concern:*

Be it known that I, EDWARD S. EVANS, a citizen of the United States of America, residing at Richmond, in the county of Henrico and State of Virginia, have invented certain new and useful Improvements in Chock-Blocks, of which the following is a specification.

This invention relates to certain new and useful improvements in chock blocks, particularly those used for securing vehicles such as automobiles in fixed position in the car in which they are shipped.

In the shipment of automobiles, it is now the general practice to ship the same in built-up condition, and it is necessary to so secure the same in the car in which they are shipped, that there shall be absolutely no movement of the automobile independently of the carrying car. Numerous types of vehicles are of very considerable weight, and the jarring and "bumping" to which the carrying car is subjected in travel necessitates firm securing of the automobile in the carrying car, that the automobile may not become loosened in the carrying car and thus become damaged, or damage other automobiles in the carrying car.

The present invention is of the general type shown, described and claimed in my Patent #1,188,745 granted June 27, 1916, the object of this invention being to provide a chock block of this general type adapted for use particularly in connection with heavy automobile trucks and the like that are usually provided with a solid tread, and which tread is usually formed with two tread-surfaces divided by a groove extending circumferentially of the tire, the present invention having means for engagement in such groove, whereby when the chock block is positioned and secured, any lateral as well as longitudinal movement of the vehicle is prevented.

Specifically, the present invention embodies, in addition to the tire-engaging means which prevents lateral movement of the automobile, the feature of providing for the ready securing of the chock-block to the floor of the carrying car, as fully set forth and described in my prior application above referred to.

The invention is herein shown as applied to a wheel having a double-tread tire to which it is particularly adapted, and in describing the invention in detail, reference will be had to the accompanying drawings forming a part of this specification, and wherein like numerals of reference will be employed for indicating like parts throughout the different views of the drawings, in which:

Fig. 3 is a view of the chock-block in side elevation in applied and secured position, a portion of the wheel to which the block is applied being shown, with the tire of said wheel broken away.

Fig. 4 is a transverse vertical sectional view of the chock-block in applied position on the wheel, the section being taken on line 4—4 of Fig. 3, and Fig. 5 is a top plan view of a chock-block in accordance with this invention.

Figure 1:
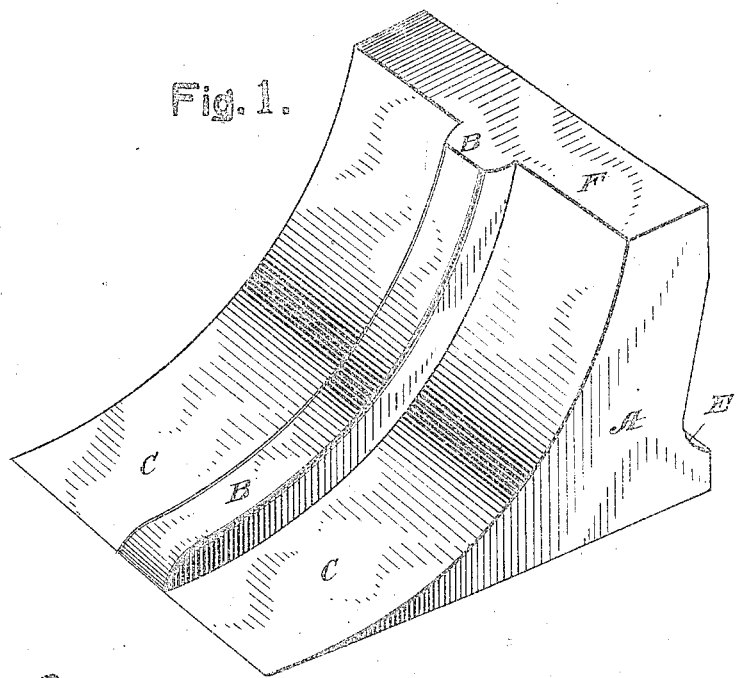
Figures 1 and 2 are perspective views of a chock-block in accordance with the present invention.
Figure 2:
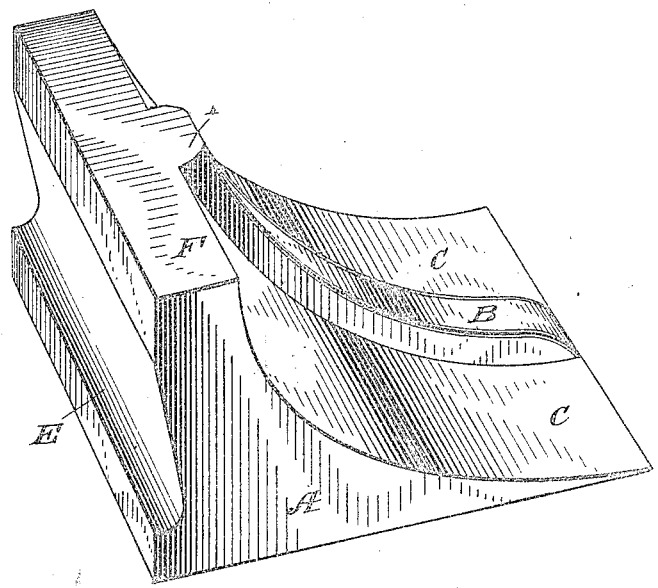

The chock-block of the present invention, like that shown and described in my prior patent above referred to, is usually formed of wood, short ends of logs or timbers of relatively sound nature, but which, owing to their lengths, may not be worked into merchantable lumber for other purposes, being usable. These pieces or timbers are sawed into lengths of generally rectangular form in cross section from which two blocks may be produced in a manner as fully set forth in my prior patent referred to.

The block as here shown is designated generally as A, and has a base-length somewhat exceeding its height at its highest point, the width being such as to not only give a secure purchase upon the floor of the carrying car, but to also provide for the formation on the tire abutting face of an abutting rib, and tire-abutting faces at each side of said rib.

The tire-abutting face of the block is cut on an arc, and extending centrally throughout the length of this face is a rib B, dividing the tire-abutting face on the block into two tire-abutting faces, C, one at each side of the rib B. As stated, the present device is specifically adapted to tires having double tread surfaces, and in this type of tire, the two tread surfaces of the tire are separated by a groove D extending circumferentially of the tire, the walls of which groove are usually somewhat inclined inwardly as shown in Fig. 4, the rib B of the block, in practice, being shaped to conform to the shape of the tire-groove.

It is preferred to construct this block with the heel or ledge E on the rear face of the block to provide for the ready and proper insertion of the securing means such as nails, screws or the like which may be employed. This heel or ledge, as fully set forth in my said prior patent, is formed by making an incut into the rear face of the block, so that the rear face of the heel lies in the same plane as the rear face of the block above the point where the incut is made into the block. This incut may be easily made by a band saw, the cut being started at a point sufficiently far below the top face F, of the block so as not to weaken the block, and turned outward on a gradual curve to produce the ledge E that provides a relatively broad and comparatively plane surface for the insertion of the securing means G, enabling the insertion of such securing means at an angle close to the vertical, assuring them against withdrawal due to strains or stresses imposed on the chock-block. This specific manner of making the incut to provide the heel or ledge I find in practice to be of considerable advantage, the curve at the base of the incut being such as to produce, on the top face of the heel or ledge a surface which acts to center the nail or other device at the proper distance from the rear face of the block, to insure proper positioning of such securing device. This result is due to the somewhat curved top face of the heel or ledge, the nail or other fastening device when rested lightly thereon tending to ride into the base of the groove at the proper point for driving.

Blocks of this type, as fully set forth in my said prior patent, do not interfere with the proper securing of the wheels of the automobile, even though the cars are arranged tandem in the carrying car, with the front wheels of one automobile practically engaging the rear wheels of the other automobile, as the chock-block lies within the maximum diameter of the wheel tire. If any portion of the chock-block in such case projected beyond the rear face, it would be impossible to position either one or the other of the blocks.

The rib B acts as a wedge and serves to prevent any lateral shifting of the automobile, while also acting as a guide to properly position the chock-block with respect to the tire, and when the blocks are fastened down, one in front, and one in the rear of each wheel, as is understood, the wheel is securely held against movement in either lateral or longitudinal direction.

What I claim as new is:—

A chock-block having a wheel-abutting face, and a projecting rib on said face intermediate the sides of the block.

In testimony whereof I affix my signature.

EDWARD S. EVANS.